(No Model.)
G. B. SIEGENTHALER.
RUBBER SANDAL.
No. 440,513. Patented Nov. 11, 1890.
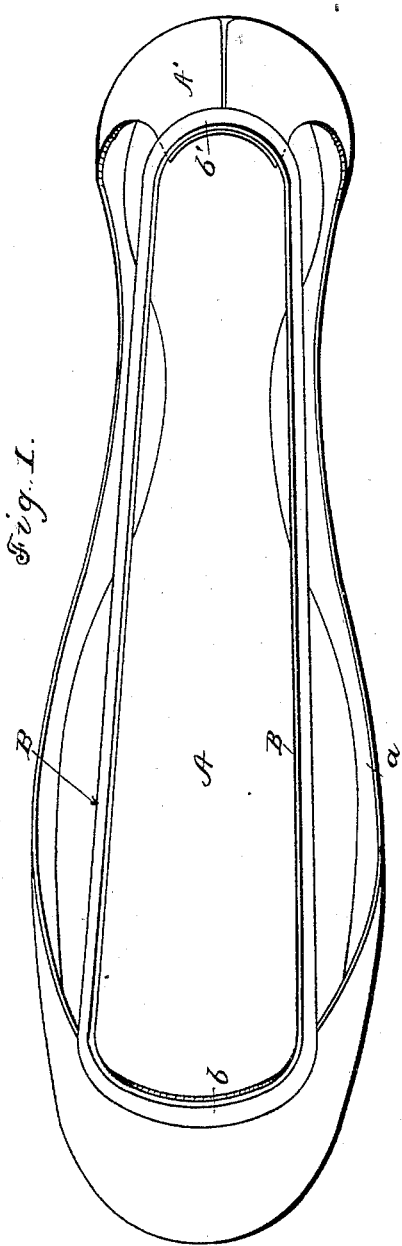
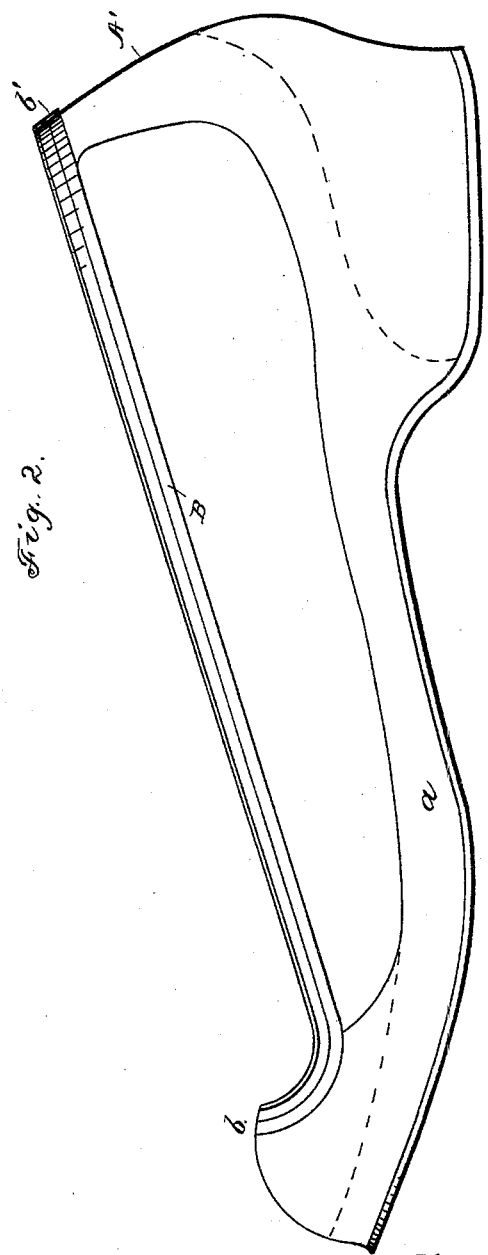
Witnesses
W. R. Edlen
L. W. Hoover
Inventor
George B. Siegenthaler.
By Leggett & Leggett
Attys

UNITED STATES PATENT OFFICE.

GEORGE B. SIEGENTHALER, OF WOOSTER, OHIO.

RUBBER SANDAL.

SPECIFICATION forming part of Letters Patent No. 440,513, dated November 11, 1890.

Application filed July 14, 1890. Serial No. 358,624. (No model.)

*To all whom it may concern:*

Be it known that I, GEORGE B. SIEGENTHALER, of Wooster, in the county of Wayne and State of Ohio, have invented certain new and useful Improvements in Rubber Sandals; and I do hereby declare the following to be a full, clear, and exact description of the invention, such as will enable others skilled in the art to which it pertains to make and use the same.

My invention relates to improvements in rubber sandals; and it consists in certain features of construction and in combination of parts hereinafter described, and pointed out in the claims.

In the accompanying drawings, Figures 1 and 2 are respectively a plan and a side elevation of a sandal embodying my invention.

A represents the rubber sandal, the same having low sides, as shown at $a$, designed only to cover the edges of the sole of the shoe. The sandal is provided with a heel-piece or counter A', that extends well up over the counters of the shoe. A narrow rubber band B is cemented or otherwise secured to the toe of the sandal, as shown at $b$, this band being also secured to the upper extreme of member A', as shown at $b'$. This band holds the sandal in place and prevents its falling off in walking.

The sandal is light, and from the fact that the sides are so low there is no pressure on the sides of the foot or disagreeable feeling at the joints of the foot, as is had with a rubber shoe, and at the same time the sandal will keep its place on the foot as well as a high rubber shoe.

The sandals can be manufactured at a comparatively small initial cost, from the fact that there is so little material in them.

What I claim is—

The combination, with a rubber sandal having a high heel-piece or counter, of a rubber band extending from the upper extreme of the heel-piece to the toe of the sandal and disconnected from the body of the sandal between these points, substantially as set forth.

In testimony whereof I sign this specification, in the presence of two witnesses, this 22d day of May, 1890.

GEORGE B. SIEGENTHALER.

Witnesses:
FRANK TAGGART,
C. D. TODD.